United States Patent
Ju et al.

(10) Patent No.: US 10,626,227 B2
(45) Date of Patent: Apr. 21, 2020

(54) METHOD OF PREPARING RESIN POWDER AND INTEGRATED COAGULATOR FOR THE SAME

(71) Applicant: LG CHEM, LTD., Seoul (KR)

(72) Inventors: Min Cheol Ju, Daejeon (KR); Min Seung Shin, Daejeon (KR); Won Seok Lee, Daejeon (KR); Hyung Sub Lee, Daejeon (KR); Seok Goo Jang, Daejeon (KR); Jeong Su Choi, Daejeon (KR); Sung Won Hong, Daejeon (KR); In Soo Kim, Daejeon (KR); Ho Hoon Kim, Daejeon (KR); Sang Hoo Park, Daejeon (KR); Keun Hoon Yoo, Daejeon (KR); Roo Da Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 20 days.

(21) Appl. No.: 14/900,043

(22) PCT Filed: Aug. 31, 2015

(86) PCT No.: PCT/KR2015/009161
§ 371 (c)(1),
(2) Date: Dec. 18, 2015

(87) PCT Pub. No.: WO2016/036095
PCT Pub. Date: Mar. 10, 2016

(65) Prior Publication Data
US 2018/0155507 A1    Jun. 7, 2018

(30) Foreign Application Priority Data

Sep. 3, 2014    (JP) .......................... 10-2014-0116653
Aug. 17, 2015   (JP) .......................... 10-2015-0115586

(51) Int. Cl.
| | | |
|---|---|---|
| C08J 3/16 | (2006.01) | |
| C08F 6/22 | (2006.01) | |
| C08F 6/18 | (2006.01) | |
| C08F 279/06 | (2006.01) | |
| C08C 1/15 | (2006.01) | |
| C08L 9/10 | (2006.01) | |
| B01J 19/18 | (2006.01) | |
| C08F 279/02 | (2006.01) | |

(52) U.S. Cl.
CPC ............. *C08J 3/16* (2013.01); *B01J 19/1812* (2013.01); *C08C 1/15* (2013.01); *C08F 6/18* (2013.01); *C08F 6/22* (2013.01); *C08F 279/02* (2013.01); *C08F 279/06* (2013.01); *C08L 9/10* (2013.01); *C08J 2309/10* (2013.01); *C08J 2351/04* (2013.01)

(58) Field of Classification Search
CPC ...... C08J 3/16; C08J 2309/10; B01J 19/1812; C08F 279/02
USPC ....................................................... 525/329.3
See application file for complete search history.

(56) References Cited

U.S. PATENT DOCUMENTS

| | | | | |
|---|---|---|---|---|
| 4,136,251 A | * | 1/1979 | Bice | ........................ B29C 47/76 159/2.2 |
| 2007/0060710 A1 | | 3/2007 | Jeong et al. | |

FOREIGN PATENT DOCUMENTS

| | | |
|---|---|---|
| EP | 3118258 A1 | 1/2017 |
| GB | 2157297 A | 10/1984 |
| JP | 54-050587 A | 4/1979 |
| JP | 60-025451 A | 2/1985 |
| JP | 03-258801 A | 11/1991 |
| JP | 09-104715 A | 4/1997 |
| JP | 2000-007728 A | 1/2000 |
| JP | 2002-241505 A | 8/2002 |
| JP | 2013-501821 A | 1/2013 |
| KR | 10-2007-0041304 A | 4/2007 |
| KR | 10-2009-0084332 A | 8/2009 |
| KR | 10-2011-0015074 A | 2/2011 |
| KR | 2011-0015074 * | 2/2011 |
| KR | 10-2014-0141067 A | 12/2014 |

OTHER PUBLICATIONS

KR 2011-0015074; Feb. 2011; EPO machine translation.*
International Search Report for PCT/KR2015/009161 filed on Aug. 31, 2015.
Extended European Search Report for EP Application No. 15804296.0, dated Mar. 6, 2017.

* cited by examiner

*Primary Examiner* — Hui H Chin

(57) ABSTRACT

Disclosed are a method of preparing a resin powder and an integrated reactor for the same. When a coagulation process is performed using an acidic coagulant in the integrated coagulator for latex coagulation and aging according to the present invention, a remaining acidic coagulant is also removed from a reactor through neutralization, and thus, a resin powder having enhanced moist-heat resistance and thermal stability may be prepared.

9 Claims, 2 Drawing Sheets

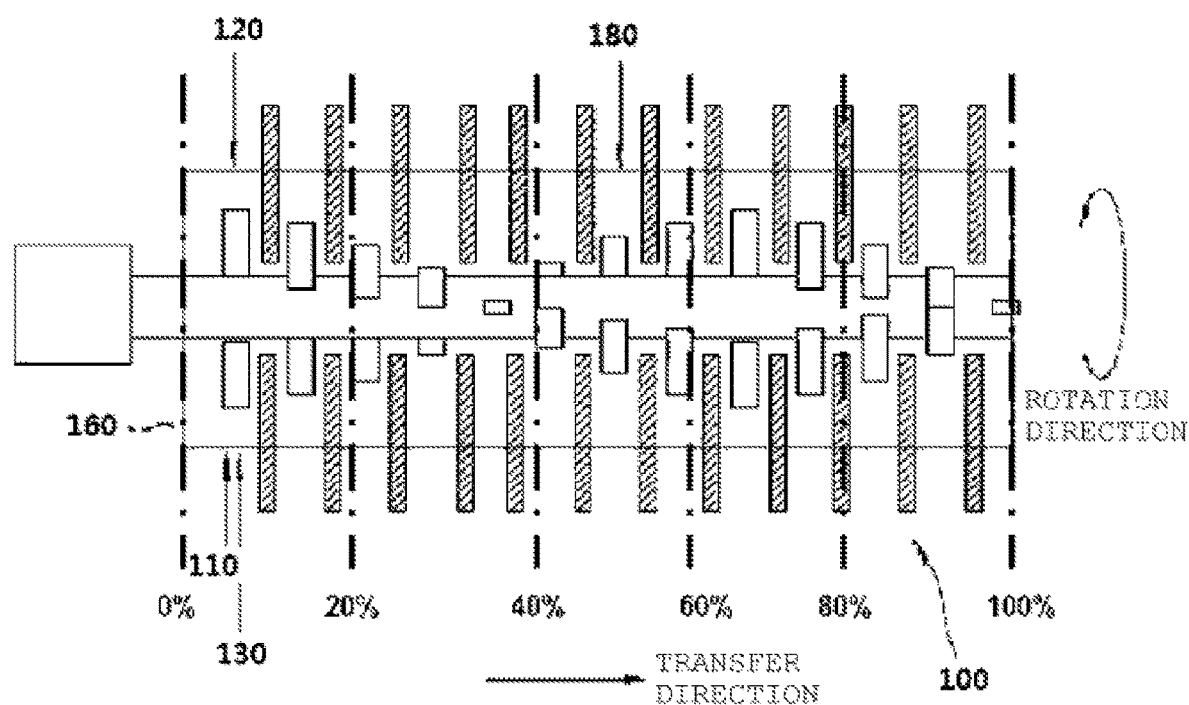

METHOD OF PREPARING RESIN POWDER AND INTEGRATED COAGULATOR FOR THE SAME

CROSS-REFERENCE TO RELATED APPLICATIONS

The present application is a National Stage of International Patent Application No. PCT/KR2015/009161 filed on Aug. 31, 2015, which claims priority to Korean Patent Application No. 10-2014-0116653 filed on Sep. 3, 2014, and Korean Patent Application No. 10-2015-0115586 filed on, Aug. 17, 2015, the disclosures of which are hereby incorporated in their entirety by reference.

TECHNICAL FIELD

The present invention relates to a method of preparing a resin powder. More particularly, the present invention relates to a method of preparing a resin powder wherein a coagulation process is carried out using an acidic coagulant in an integrated coagulator for latex coagulation and aging, and especially the acidic coagulant remaining after the coagulation process also is removed from the coagulator through neutralization, whereby disadvantages due to a coagulant remainder are overcome and moist-heat resistance and thermal stability are enhanced.

BACKGROUND ART

Polymer materials formed from emulsion polymerization are preferably processed into a powder to accomplish volume reduction, various application and easy handling. In order to obtain powder-type polymer materials formed from emulsion polymerization, latex formed from the emulsion polymerization require to coagulation, aging, dehydration and drying.

Coagulation of emulsion polymerization latex (hereinafter referred to as latex) may be carried out by disturbing, through a chemical method of using various coagulant or a mechanical method of using mechanical force such as strong shearing force, stability of latex particles stabilized by an emulsifier added during emulsion polymerization. In the chemical method, a coagulant type different from an emulsifier type used to secure stability of latex and thus stability is disturbed. When a mechanical method is used to disturb stability, strong shearing force is applied to latex, whereby repulsive force between emulsifiers is overcome and latex particles and other particles are flocculated.

FIG. 1 is a view illustrating an embodiment of a multi-step coagulation process according to conventional technology. Particularly, FIG. 1 illustrates a schematic flowchart in manufacturing equipment of a latex resin powder used in Korean Patent No. 2011-0083024, titled "Polymer slurry having high solid content and method of preparing the same." The equipment includes largely a latex storage tank 1, a coagulation tank 2, an aging tank 6, a dehydrator 8 and a fluidized bed dryer 10.

In particular, an aqueous coagulant solution 4 is input until the aqueous coagulant solution 4 reaches an upper portion of the coagulation tank 2, and inner temperature thereof is elevated to a coagulation temperature. After a coagulation tank temperature reaches the coagulation temperature, latex in the latex storage tank 1 is transferred and input to the coagulation tank 2. Subsequently, a generated slurry is transferred to the slurry storage tank 7 via the aging tank 6.

Next, dehydration is continuously performed while supplying a slurry to a centrifugal dehydrator 8 using a pump. Here, wastewater 9 generated through dehydration is discarded. A resultant dehydrated slurry along with air is supplied into the fluidized bed dryer 10. The supplied air dehydrates the slurry while moving the same up and down. Dehydrated particles are supplied into cyclone 1 11 by air. At this time, large normal particles 12 fall into a lower portion, and light and small particles are transferred to a cyclone 2 13 and collected as denoted by an arrow 14. Air is released through a line 15. However, when the device is used, it is difficult to stir a slurry having high viscosity and smooth transfer is not exhibited, thereby decreasing powder process efficiency. Accordingly, it is difficult to use a slurry having a high solid content to increase dehydration and drying efficiency, and much time, effort and energy are consumed in subsequent dehydration and drying processes.

In order to enhance such problems, the inventors of the present invention introduced a technology related to a coagulator in which coagulation and aging are simultaneously performed in Korean Patent No. 2013-0159970.

The coagulator in which coagulation and aging are simultaneously performed may include a hollow reaction pipe 160 through which latex passes, one or more barrel pins protruded in an inner side direction of the reaction pipe 160 from an inner wall of the reaction pipe 160, a mixing shaft extended along a center axis of a transfer direction (length direction) of the reaction pipe and one or more stirrers protruding to an inner side of the reaction pipe from an outer side of the mixing shaft, as illustrated in FIG. 2 as a cross-sectional view. Here, a coagulator 100 may be composed of one or more stirrers having non-continuous screws 210.

That is, turbulent flow of latex is induced by substituting at least one of multiple stirrers 150 with the non-continuous screws 210, and thus, a mixing efficiency of a coagulant is increased and a moisture content of a slurry is decreased, whereby subsequent processes such as dehydration and drying are simplified and energy saving effects are accomplished. In addition, the color of an obtained resin powder is enhanced through decrease of the amount of coagulant consumed in a coagulation process and thus quality enhancement effects are provided. A cross section of the reaction pipe 160 may be an arbitrary polygon or a circle, particularly a circle.

The coagulator 100 is designed such that coagulation and aging are performed together, and includes a hollow reaction pipe 160 through which latex passes, one or more barrel pins 140 protruded in an inner side direction of the reaction pipe 160 from an inner wall of the reaction pipe 160, a mixing shaft 170 extending along a center axis of a transfer direction of the reaction pipe 160 and one or more stirrers 150 protruded in an inner wall direction of the reaction pipe 160 from an outer side of the mixing shaft 170. Here, the reaction pipe 160 is composed in a such way that a latex input line 110, a coagulant input line 120 and a steam input line 130 are connected, and latex, a coagulant and steam are supplied into the reaction pipe 160.

The coagulator 100 may include 1 to 20, 4 to 16, or 8 to 12 non-continuous screws 210. Within this range, flow of fluid (non-condensed steam and latex) is disturbed and turbulent flow of latex is induced, and thus a mixing efficiency of steam, latex and a coagulant is increased. However, the non-continuous screws 210 may be disposed in a proper number depending upon the length (L) of the coagulator 100.

The barrel pins 140 extending from the exterior of the reaction pipe 160 to the interior thereof are fixed to the coagulator 100, and the stirrer 150 and/or the non-continuous screws 210 are rotatably fixed to the interior of the reaction pipe 160. In particular, the reaction pipe 160 of the coagulator 100 includes the one or more barrel pins 140 extending to the interior of the reaction pipe 160 from the exterior of the reaction pipe 160. Accordingly, in the reaction pipe 160, latex introduced to the reaction pipe 160 is transferred in a transfer direction when the stirrers 150 and/or the non-continuous screws 210 between the barrel pins 140 fixed to the reaction pipe 160 are rotated, and thus, the latex contacts rotation wings of the stirrers 150 and/or the non-continuous screws 210. The latex collides with the barrel pins 140 through mechanical force generated by such contact, and thus, strong mechanical force, i.e., shearing force is applied to the latex and a stabilized state of latex is disturbed, through a mechanical method, due to an emulsifier added upon emulsion polymerization. Accordingly, coagulation is performed and aging is performed at the rear of the reaction pipe 160.

The shape of the barrel pins 140 may be a circle, a triangle, an inclined shape, an oval shape, a diamond shape, a quadrangle, or the like, and is not specifically limited. In the case of the stirrers 150, any one of a paddle, a screw, a twin screw, a pin, and the like may be used.

The reactor 100 including the non-continuous screws 210 may control a moisture content of latex by providing mechanical force to the latex obtained by the action of the barrel pins 140 and the inner stirrers 150 and/or the non-continuous screws 210.

The coagulator 100 includes the latex input line 110, the coagulant input line 120 and the steam input line 130. Coagulation occurs near a location at which latex, a coagulant and steam are input, and aging is performed in a rear portion of the coagulator. Accordingly, coagulation and aging may be simultaneously performed in one coagulator.

Surface treatment may be performed using a mixer, which induces mixing with a fluid through strong shearing force, such as an in-line mixer. The mixer may be a mixer, in which simple mixing is performed by changing a flow line of a fluid in a pipe, such as a static mixer.

However, even when the coagulator is applied, there are problems due to a remainder of the used coagulant. For example, when a metal ion coagulant is used, thermal stability is enhanced, but moist-heat resistance is decreased due to a remaining metal. When an acidic coagulant is used, moist-heat resistance is enhanced, but thermal stability is decreased due to an acidic remainder.

Accordingly, there is an urgent need for latex powder production technology which may address problems due to a coagulant remainder and simultaneously provide thermal stability secured through application of a metal ion coagulant and moist-heat resistance secured through application of an acidic coagulant.

DISCLOSURE

Technical Problem

The present inventors conducted research to address conventional problems described above and, as a result, confirmed that, when an integrated coagulator in which coagulation and aging may be simultaneously performed, is used, moist-heat resistance is enhanced by using an acidic coagulant in a coagulation process and removing an acid remainder through neutralization in a specific section of the coagulator, and thus, thermal stability secured through application of a conventional metal ion coagulant may be enhanced, thereby completing the present invention.

Therefore, the present invention has been made in view of the above problems, and it is one object of the present invention to provide a method of preparing a resin powder wherein a coagulation process is carried out using an acidic coagulant in an integrated coagulator for latex coagulation and aging, and the acidic coagulant remaining after the coagulation process also is removed from the coagulator through neutralization, whereby disadvantages due to a coagulant remainder are overcome and moist-heat resistance and thermal stability are enhanced.

Technical Solution

In accordance with one aspect of the present invention, provided is a method of preparing a resin powder, comprising
a latex coagulation process by input of an organic acid, a neutralization process of a remaining organic acid by input of a neutralization agent, and an aging process for the resin powder,
wherein the latex coagulation process, the neutralization process and the aging process are continuously performed in an integrated coagulator for latex coagulation and aging,
wherein the latex coagulation process comprises input of some organic acid in a position of the integrated coagulator for latex coagulation and aging, and
wherein the neutralization process of the remaining organic acid comprises input of a neutralization agent for neutralizing the remaining organic acid in a downstream position of the position to which the organic acid is inputted.

In an embodiment, the input of the neutralization agent is performed at the position having a moisture content of the resin powder of 30 to 60% by weight in the integrated coagulator.

In an embodiment, each of the input of the latex and the input of the organic acid is performed in a section of 0 to 20% the length toward a transfer section toward a transfer direction of a reaction pipe outlet end portion from a reaction pipe inlet end portion of the integrated coagulator.

In an embodiment, the neutralization agent is performed in a section of 40 to 60% the length toward a transfer section toward transfer direction of a reaction pipe outlet end portion from a reaction pipe inlet end portion of the integrated coagulator.

In an embodiment, the organic acid as a coagulant may be added in an amount of 0.5 to 3.0 parts by weight based on the 100 parts by weight of the latex.

In an embodiment, the organic acid as a coagulant may be one or more selected from formic acid and acetic acid.

In an embodiment, the neutralization agent may be one or more selected from caustic soda, caustic potash, sodium carbonate, ammonium hydroxide, aniline, diethylamine and hydrazine.

In an embodiment, the neutralization agent may be added in an amount of 30 to 70% by weight based on an input amount of the organic acid as a coagulant.

In an embodiment, each of the latex coagulation process, the neutralization process and the aging process may be performed at 60 to 98° C. under steam.

In an embodiment, the latex continuously may flow in the integrated coagulator.

In an embodiment, the integrated coagulator may comprise a latex input line, an organic acid input line, a neutralization agent input line and a resin powder discharge line arranged toward a transfer direction of latex, and a mixing shaft with a plurality of impellers extended from a reaction pipe end portion at an inlet of the coagulator to a reaction pipe end portion at an outlet thereof.

In an embodiment, the latex may be one or more selected from styrene polymer latex, butadiene polymer latex, styrene-butadiene copolymer latex, alkyl acrylate polymer latex, alkyl methacrylate polymer latex, alkyl acrylate-acrylonitrile copolymer latex, acrylonitrile-butadiene copolymer latex, acrylonitrile-butadiene-styrene copolymer latex, acrylonitrile-alkyl acrylate-styrene copolymer latex, alkylmethacrylate-butadiene-styrene copolymer latex and alkylacrylate-alkylmethacrylate copolymer latex.

In accordance with another aspect of the present invention, provided is an integrated coagulator for latex coagulation and aging, comprising a hollow reaction pipe through which the latex passes, at least one barrel pin protruded from an inner wall of the reaction pipe to an interior of the reaction pipe, a mixing shaft extended according to a center axis of a transfer direction of the reaction pipe and at least one impeller protruding from an outer side of the mixing shaft to an inner wall of the reaction pipe, wherein the at least one impeller is substituted with a non-continuous screw, a latex input line, an input line of an organic acid as a coagulant and a steam input line are provided to an inlet of the coagulator, and the neutralization agent input line is provided to a downstream part of the inlet of the coagulator.

In an embodiment, each of the latex input line and the input line of the organic acid as a coagulant input may be connected to a section of 0 to 20% the length toward a transfer direction from a reaction pipe end portion at an inlet of the integrated coagulator to a reaction pipe end portion at an outlet thereof.

In an embodiment, the neutralization agent input line may be connected to a section of 40 to 60% the length toward from a reaction pipe end portion at an inlet of the integrated coagulator to a reaction pipe end portion at an outlet thereof.

In accordance with yet another aspect of the present invention, provided is a resin powder that is obtained according to the method described above and has enhanced moist-heat resistance (Hz) and thermal stability ($\Delta b$, $\Delta E$).

Advantageous Effects

As apparent from the fore-going, the present invention advantageously provides a method of preparing a resin powder wherein a coagulation process is carried out using an acidic coagulant in an integrated coagulator for latex coagulation and aging, and the acidic coagulant remainder is also removed from the coagulator through neutralization, whereby moist-heat resistance and thermal stability are enhanced.

DESCRIPTION OF DRAWINGS

FIG. 3 is a cross-sectional view of a coagulator according to the present invention, which includes a coagulator illustrated in FIG. 2 and a neutralization agent input line 180 added thereto, and in which latex coagulation and aging are simultaneously performed.

DESCRIPTION OF SYMBOLS

100: REACTOR
110, 11: LATEX INPUT LINE
120, 12: COAGULANT INPUT LINE
130: STEAM INPUT LINE
140: BARREL PINS
150: STIRRER
180: NEUTRALIZATION AGENT INPUT LINE
210: NON-CONTINUOUS SCREW
1: LATEX STORAGE TANK
2: COAGULATION BATH
3: AGING BATH
4: DEHYDRATOR
5: DRYER
13: WATER SUPPLY LINE
14: COAGULANT DISCHARGE
15: FINAL POLYMER POWDER

[Best Mode]

Now, the present invention will be described in more detail with reference to the following examples. These examples are provided only for illustration of the present invention and should not be construed as limiting the scope and spirit of the present invention.

In an embodiment of a method of preparing a resin powder according to the present invention, an acid coagulation process of latex, a neutralization process of an acidic coagulant used in the acid coagulation process, and an aging process of a generated resin powder are sequentially performed in an integrated coagulator for latex coagulation and aging.

Figure 1:
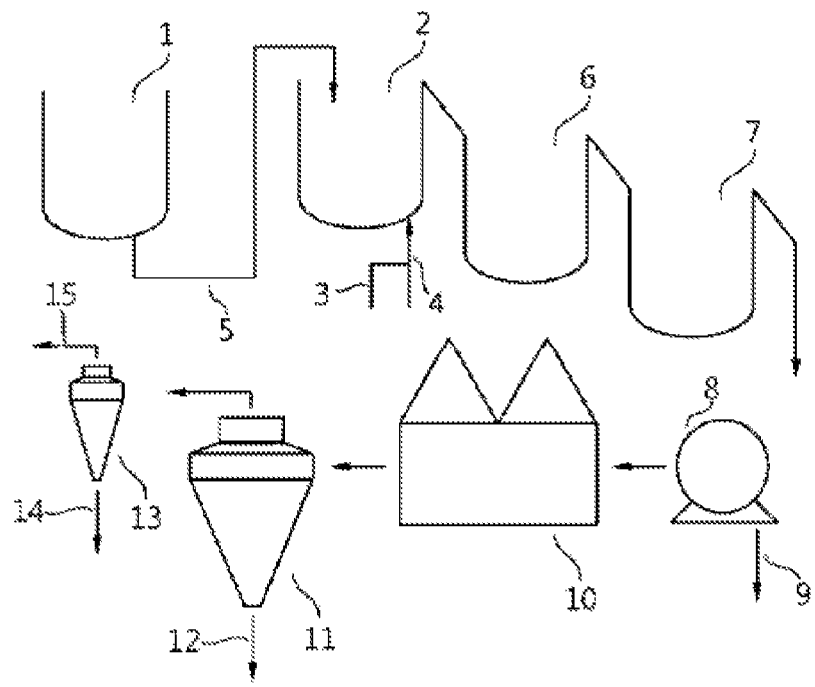
FIG. 1 is a flowchart illustrating a process of manufacturing a powder, including multi-step coagulation and aging processes of latex according to conventional technology.
Figure 2:
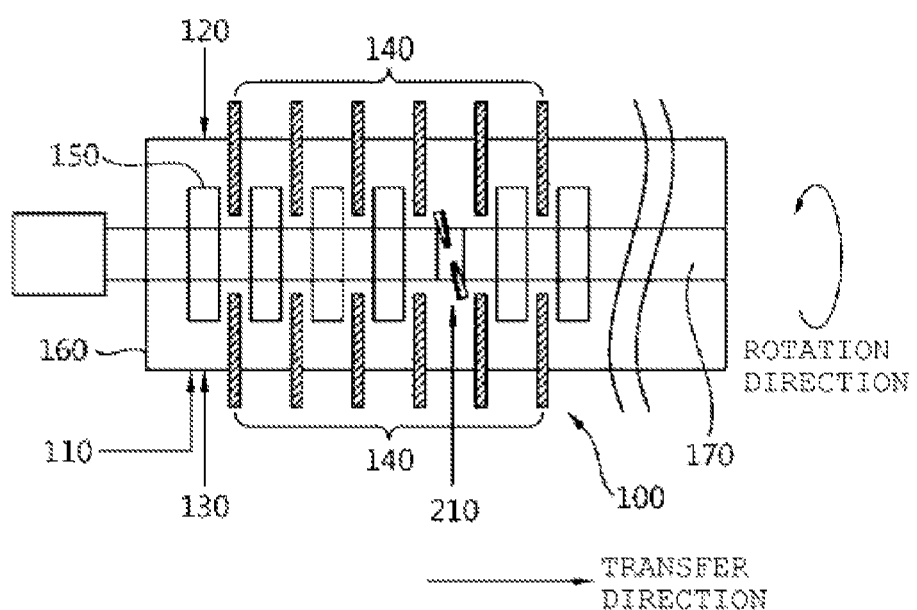
FIG. 2 is a schematic cross-sectional view of a coagulator in which latex coagulation and aging are simultaneously performed according to conventional technology.

The expression "integrated coagulator for latex coagulation and aging" denotes a device in which a coagulation process and an aging process may be simultaneously realized. Such a device includes an integrated mechanical coagulator, and denotes a reactor illustrated in FIG. 3, so long as not specified otherwise. For reference, a reactor illustrated in FIG. 3 includes a reactor illustrated in FIG. 2 and a neutralization agent input line 180, and a cross-sectional view showing detailed locations thereof is illustrated in FIG. 3.

The expression "aging" means holding at a predetermined temperature such that binding force is enhanced due to interpenetration between chains, without addition of other materials, after the neutralization process or the neutralization agent input, or holding, without dehydration and/or drying, after the neutralization process or the neutralization agent input. The holding means remaining in a reaction pipe for a predetermined time after inputting a neutralization agent to the integrated coagulator for latex coagulation and aging. Here, retention time, i.e., aging time, means time between neutralization agent input and discharge through a reaction pipe. The retention time is not specifically limited so long as discharge is not immediately performed after the neutralization agent is input. In an embodiment, when a total length of a reaction pipe in which coagulation and aging are carried out is 100, the retention time may be time taken to pass through a section of the reaction pipe corresponding to 40 to 60 the length thereof. In particular, the retention time may be time taken to pass through a section corresponding to 40 to 100% the length toward a transfer direction from a reaction pipe end portion at an inlet of the integrated coagulator to a reaction pipe end portion at an outlet thereof.

In an embodiment, the aging temperature may be equal to or greater than the coagulation temperature. In a specific embodiment, the aging temperature may be 60 to 98° C., or 85 to 95° C.

In an embodiment, the retention time may be 1.0 sec to 30 min, 5 sec to 20 min, 5 sec to 10 min, 30 sec to 5 min, or 1 min to 2 min.

The expression "powder" means a material in which a large number of solid particles are gathered. In an embodiment, an average particle diameter of the gathered solid particles may be 1 to 10000 μm, or 10 to 2000 μm.

The expression "slurry" used in this disclosure is not specifically limited so long as the slurry is known in the art. In an embodiment, the slurry means latex may mean a solution composed of a coagulated a resin powder formed through addition of a coagulant to latex.

The neutralization process is performed to remove an acid remainder in an acidic coagulant. Preferably, the neutralization process is performed after the coagulation process is sufficiently performed and thus coagulated particles are formed. In addition, in a downstream part of the integrated coagulator (downstream process), a coagulation degree increases, but pH relatively increases and thus foam generation may be caused. Considering this, a neutralization agent input section to perform a neutralization process may be determined.

When the neutralization process is performed in a section corresponding to 40 to 60% or 45 to 55% the length of the transfer section toward a transfer direction from an inlet of the integrated coagulator (initial process step), a coagulation degree may be increased and foam generation may be lowered.

As illustrated in FIG. 3, the expression "% section" in a section in the transfer direction means a corresponding section when the total length of a hollow reaction pipe is supposed to be 100%.

As an input location of the neutralization agent is downstream of a 60 to 100% section of the integrated coagulator, substitution of a remaining acid becomes poor. As the input location is upstream of a 0 to 40% section, coagulation might not be performed.

In another embodiment, preferably, the neutralization agent is input when a slurry being transferred in the integrated coagulator is dehydrated and a moisture content thereof is 30 to 60% by weight, or 35 to 50% by weight. Within this range, a coagulation degree is high and foam generation effects are low.

The moisture content of the resin powder is measured using a moisture analyzer available from METTLER TOLEDO.

In an embodiment, the neutralization agent may be one or more selected from caustic soda, caustic potash, sodium carbonate, ammonium hydroxide, aniline, diethylamine, hydrazine, etc.

In an embodiment, in the neutralization process, pH of the slurry after neutralization agent input may be 4.0 to 8.0, 4.5 to 8.0, 4.5 to 7.0, or 4.5 to 6.0. Within this range, a coagulation degree is high and the amount of generated foam is small.

As described above, when a neutralization process is performed in the integrated coagulator, it is preferable to input the acidic coagulant such that an acid remainder is not excessively generated. In an embodiment, the acidic coagulant may be input in an amount of 0.5 to 3.0 parts by weight, 0.5 to 2.5 parts by weight, 0.7 to 2.3 parts by weight, 0.5 to 1.5 parts by weight, or 0.7 to 1.2 parts by weight based on 100 parts by weight of a polymer. Within this range, a resin powder exhibits superior moist-heat resistance and thermal stability. Here, "100 parts by weight of a polymer" means 100 parts by weight of a solid polymer slurry.

In an embodiment, each of the latex input and the organic acid input may be performed in a section corresponding to 0 to 20% the length toward a transfer direction from a reaction pipe end portion at an inlet of the integrated coagulator to a reaction pipe end portion at an outlet thereof. Within this range, a coagulation degree is high.

In an embodiment, the organic acid input may be performed at the same site as or a downstream site of the site at which the latex input is performed.

The acidic coagulant may be any one of organic acids such as formic acid and acetic acid, except for strong acids such as hydrochloric acid, sulfuric acid and phosphoric acid. For reference, when a strong acid is used, dangerous problems such as corrosion and instability may occur in use.

In a specific embodiment, the formic acid may be input in an amount of 0.5 to 2.0 parts by weight, 0.5 to 1.0 part by weight, or 0.6 to 0.9 part by weight based on 100 parts by weight of the polymer. Within this range, a resin powder exhibits superior moist-heat resistance and thermal stability.

In addition, the acetic acid may be input in an amount of 0.5 to 2.0 parts by weight, 0.7 to 1.3 parts by weight, or 0.8 to 1.2 parts by weight based on 100 parts by weight of a polymer. Within this range, a resin powder exhibits superior moist-heat resistance and thermal stability.

Here, water may be input as a mixture with the organic acid as a coagulant or separately.

In an embodiment, water including steam may be input such that the content of a latex solid is 10 to 90% by weight, 10 to 50% by weight, or 20 to 40% by weight. Within this range, a coagulation degree is high and the amount of generated foam is small.

As described above, the content of the neutralization agent is sufficient if an acid remainder may be neutralized. In an embodiment, when the content of the neutralization agent input to the neutralization section (a section of 40 to 60% the length toward a transfer direction from an inlet of the reactor) is 30 to 75% by weight or 45 to 70% by weight based on the content of an input acidic coagulant, a neutralization process may be efficiently performed without side reaction.

In another embodiment, the neutralization agent may be input in an amount of 0.2 to 0.75 mole or 0.3 to 0.6 mole based on 1 mole of the organic acid as a coagulant. Within this range, a neutralization process may be efficiently performed without side reaction.

In the present invention, the acid coagulation process, the neutralization process and the aging process may be performed according to general methods. In an embodiment, these processes may be simultaneously performed using steam at 60 to 98° C., 65 to 85° C., or 85 to 95° C. Within this range, excellent coagulation and aging effects are exhibited.

In an embodiment, a total retention time in the integrated coagulator may be 0.5 to 30 min, 0.5 to 10 min or 0.5 to 5 min.

In the present invention, a retention time of the polymer slurry may exceed 30 min, but, in this case, a device size increases and thus economic efficiency is low.

A solid content in a slurry including the resin powder of the present invention prepared according to the process depends upon the content of the latex solid, but is generally 25 to 60% by weight. When the solid content is less than 25% by weight, flowability of a slurry is too high and thus retention time of the slurry might not be secured. When the solid content is greater than 60% by weight, transferability of a slurry is decreased and thus the interior of a device may be plugged due to the slurry, thereby making driving of the device impossible. A polymer slurry that is coagulated and aged is released from a reactor and transferred to a slurry storage tank. The coagulated and aged slurry is collected as a powder through dehydration and drying processes.

The dehydration process is not specifically limited so long as a conventional resin powder dehydration process is used. In an embodiment, the dehydration process may be performed by dehydrating a slurry including a resin powder, using a centrifugal dehydrator.

The drying process is not specifically limited so long as a conventional resin powder drying process is used. In an embodiment, the drying process may be performed by drying a dehydrated resin powder using a fluidized bed dryer. Here, air is supplied to a fluidized bed dryer and thus drying may be performed while permitting flow of a resin powder.

In an embodiment, the dried resin powder may be supplied to a cyclone and separated into large particles and fine particles.

The latex is not specifically limited and may be one or more selected from styrene polymer latex, butadiene polymer latex, styrene-butadiene copolymer latex, alkyl acrylate polymer latex, alkyl methacrylate polymer latex, alkyl acrylate-acrylonitrile copolymer latex, acrylonitrile-butadiene copolymer latex, acrylonitrile-butadiene-styrene copolymer latex, acrylonitrile-alkyl acrylate-styrene copolymer latex, alkylmethacrylate-butadiene-styrene copolymer latex and alkylacrylate-alkylmethacrylate copolymer latex.

In an embodiment, a moisture content of a resin powder obtained by the method may be 25% by weight or less, or 10 to 20% by weight. Within this range, superior moist-heat resistance and thermal stability are exhibited.

As illustrated in FIG. 3, the integrated coagulator for latex coagulation and aging used in the present invention comprises a hollow reaction pipe through which the latex passes, at least one barrel pin protruded from an inner wall of the reaction pipe to an interior of the reaction pipe, a mixing shaft extended according to a center axis of a transfer direction of the reaction pipe and at least one stirrer protruded from an outer side of the mixing shaft to an inner wall of the reaction pipe, wherein the at least one stirrer comprises a non-continuous screw, a latex input line, a coagulant input line and a steam input line are provided to an inlet of the coagulator, and a line 180 for inputting the neutralization agent is provided to a specific section, i.e., a section of 40 to 60% the length toward a transfer direction from an inlet of the coagulator.

For reference, except for the neutralization agent input line 180, all disclosures suggested in Korean Patent No. 2013-0159970 as conventional technology may be included.

A resin powder obtained according to the method described above may exhibit enhanced moist-heat resistance (Hz) and thermal stability ($\Delta b$, $\Delta E$).

In particular, the resin powder obtained according to the method of the present invention has moist-heat resistance (Hz) equal to a resin that is coagulatedby an acidic coagulant and is not subjected to a neutralization process, and thermal stability ($\Delta b$, $\Delta E$) equal to a resin that is coagulated by a metal ion coagulant and is not subjected to a neutralization process.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Example 1

A graft copolymer latex composed of a vinylcyan compound-conjugated diene based compound-aromatic vinyl compound was an acrylonitrile (AN)-butadiene (BD)-styrene (SM)-methylmethacrylate (MMA) copolymer latex. Here, AN/BD/SM/MMA=3/50/12/35 and the content of solid was 35% by weight.

As illustrated in FIG. 3, the latex was input, at a flow rate of 12 kg/hr, to a reaction pipe including eight non-continuous screws (A2/A1=0.33, $\alpha$=3.60°) in an integrated coagulator, and formic acid as a coagulant was used in an amount of 0.7 part by weight based on 100 parts by weight of a total polymer (based on a solid). Here, water was additionally added depending upon the amount of slurry solid by directly adding steam and mixed with formic acid, whereby the content of the solid was adjusted to 30% by weight.

In a reaction pipe, retention time was 1.5 min on average, and coagulation and aging temperature was 91° C. In a section corresponding to 40 to 60% of length direction (50% section) toward a transfer direction of an integrated coagulator illustrated in FIG. 3, about 45% by weight of caustic soda, based on the input amount of the formic acid (0.3 part by weight based on 100 parts by weight of a polymer), was input to a neutralization agent input line 180, and thus an acid remainder was neutralized. As soon as the neutralization was terminated (pH 6.47), aging was performed and continued until a slurry was discharged to the outside. The coagulated slurry was released by stirrers and then transferred to a slurry storage tank. The coagulated and aged slurry was collected as a resin powder through dehydration and drying processes.

Comparative Example 1

A resin powder was prepared in the same manner as in Example 1, except that a neutralization agent was not added (pH 4.72).

Comparative Example 2

A resin powder was prepared in the same manner as in Example 1, except that 2 parts by weight of $CaCl_2$ (pH 6.3) as a metal ion coagulant was used instead of 0.7 part by weight of the formic acid used as an acidic coagulant.

Example 2

A resin powder was prepared in the same manner as in Example 1, except that 1 part by weight of acetic acid was used instead of 0.7 part by weight of formic acid and the content of caustic soda input through a neutralization agent input line was about 60% by weight based on an acetic acid input amount (pH 8.0) instead of 0.3 part by weight.

Comparative Example 3

A resin powder was prepared in the same manner as in Example 2, except that a neutralization agent was not input (pH 5.18).

Comparative Example 4

A resin powder was prepared in the same manner as in Example 1, except that 0.7 part by weight of a 5 wt % sulfuric acid solution (pH 5.1) was used instead of 0.7 part by weight of the formic acid as an acidic coagulant.

Reference Example 1

The same experiment as Example 1 was carried out, except that a neutralization agent input line 180 was located at a section of 30% the length (20 to 40%) instead of a section of 50% the length of toward a transfer section in a transfer direction of the integrated coagulator, but coagulation was not satisfactorily performed.

Reference Example 2

The same experiment as Example 1 was carried out, except that a neutralization agent input line 180 was located at a section of 70% the length (60 to 80%) instead of a section of 50% the length toward a transfer direction of the integrated coagulator, but a large amount of foam was generated and thus smooth experiments were not carried out.

Test Example

Color difference (L, a and b), moist-heat resistance Tt, moist-heat resistance Hz, light diffusivity and light transmittance, and thermal stability (Δb, ΔE) of latex resin powders prepared according to Examples 1 to 2 and Comparative Examples 1 to 4 were measured according to the following methods. Results are summarized in Table 1.

Powder color difference: L, a, and b values was measured using a color meter (Color Quest II, Hunter Lab Co.). As the L value approached 100, color was bright. When the "a" value was greater than 0, color was red, and, when the "a" value was smaller than 0, color was green. When the "b" value was greater than 0, color was yellow, and, when the "b" value was smaller than 0, color was blue.

Moist-heat resistance (Tt, Tz): Corresponds to a haze value and light transmittance of a 3 mm sheet measured according to ASTM D-1003 after being input to an oven having constant temperature and moisture.

Thermal stability (Δb, ΔE): Corresponds to difference (Δb) between a "b" value measured after being stood in an 80° C. over for seven days and a "b" value of an original specimen, and difference (ΔE) between a value calculated according to the following equation using L, a and b values measured after being stood in an 80° C. oven for seven days and an original "b" value.

$$\Delta E = [(\Delta L)^2 + (\Delta a)^2 + (\Delta b)^2]^{0.5}$$

Moisture content (% by weight): Weight change was measured using a moisture meter (METTLER/TOLEDO HR83-P) until water was completely evaporated at 150° C. and thus the sample weight was not changed (remaining moisture content: 0.5% by weight or less).

TABLE 1

| Classification | L | a | b | Tt (moist-heat resistance) | Hz (moist-heat resistance) | Δb (80° C., 7 days) | ΔE (80° C., 7 days) | Moisture content |
|---|---|---|---|---|---|---|---|---|
| Example 1 | 95.1 | −1.1 | 0.3 | 89.5 | 12.6 | 0.8 | 0.8 | 22.4 |
| Comparative Example 1 | 95.3 | −1.1 | 0.2 | 89.8 | 12.5 | 1.2 | 1.2 | 22.5 |
| Comparative Example 2 | 94.9 | −0.9 | 0.2 | 76.5 | 38.5 | 0.9 | 0.9 | 21.9 |
| Example 2 | 95.4 | −0.9 | −0.1 | 90.8 | 13.9 | 3.6 | 3.65 | 22.4 |
| Comparative Example 3 | 95.3 | −1.2 | −0.1 | 90.3 | 13.7 | 4.5 | 4.6 | 22.2 |
| Comparative Example 4 | 94.1 | −1.1 | 0.5 | 89.5 | 20.6 | 0.8 | 0.9 | 19 |

As shown in Table 1, the resin powder manufactured by the organic acid coagulation process, the neutralization process and the aging process according to the present invention exhibits enhanced moist-heat resistance and thermal stability, compared to the comparative examples.

In particular, the resin powder according to Example 1 in which formic acid is used and to which a neutralization process is applied exhibits moist-heat resistance equal or similar to that secured in Comparative Example 1 in which an organic acid as a coagulant is used and to which a neutralization process is not applied, and thermal stability equal or similar to that secured in Comparative Example 2 in which a metal ion coagulant is used and to which a neutralization process is not applied.

In addition, the resin powder according to Example 2 in which acetic acid is used and to which a neutralization process is applied exhibits moist-heat resistance equal or similar to that of Comparative Example 3 in which an acidic coagulant is used and to which a neutralization process is not applied, and thermal stability equal or similar to that of Comparative Example 2 in which a metal ion coagulant is used and to which a neutralization process is not applied.

What is claimed is:

1. A method of preparing a resin powder, comprising adding latex to an integrated coagulator comprising a reaction pipe inlet end and reaction pipe outlet end;
performing a latex coagulation process by input of an organic acid to contact the latex in the integrated coagulator;
performing a neutralization process of a remaining organic acid by input of a neutralization agent to contact the latex and the organic acid in the integrated coagulator; and
performing an aging process for the resin powder,
wherein the latex coagulation process, the neutralization process and the aging process are continuously performed in an integrated coagulator for latex coagulation and aging, wherein the latex coagulation process comprises input of some organic acid in a position of the integrated coagulator for latex coagulation and aging, and wherein the neutralization process of the remaining organic acid comprises input of a neutralization agent for neutralizing the remaining organic acid in a downstream position of the position to which the organic acid is inputted, a pH as soon as the neutralization process is terminated being 4.5 to 7.0, wherein the integrated coagulator for latex coagulation and aging is a device in which a coagulation process and an aging process may be simultaneously realized, wherein each of the input of the latex and the input of the organic acid is performed in a section of 0 to 20% the length according to a transfer section toward a transfer direction of a reaction pipe outlet end portion from a reaction pipe inlet end portion of the integrated coagulator, and wherein the input of the neutralization agent is performed in a section of 40 to 60% the length toward a transfer section toward transfer direction of a reaction pipe outlet end portion from a reaction pipe inlet end portion of the integrated coagulator.

2. The method according to claim 1, wherein the organic acid as a coagulant is added in an amount of 0.5 to 3.0 parts by weight based on the 100 parts by weight of the latex.

3. The method according to claim 1, wherein the organic acid as a coagulant is one or more selected from formic acid and acetic acid.

4. The method according to claim 1, wherein the neutralization agent is one or more selected from caustic soda, caustic potash, sodium carbonate, ammonium hydroxide, aniline, diethylamine and hydrazine.

5. The method according to claim 1, wherein the neutralization agent is added in an amount of 30 to 70% by weight based on an input amount of the organic acid as a coagulant.

6. The method according to claim 1, wherein each of the latex coagulation process, the neutralization process and the aging process is performed at 60 to 98° C. under steam.

7. The method according to claim 1, wherein the latex continuously flows in the integrated coagulator.

8. The method according to claim 1, wherein the integrated coagulator comprises a latex input line, an organic acid input line, a neutralization agent input line and a resin powder discharge line arranged toward a transfer direction of latex, and a mixing shaft with a plurality of impellers extended from a reaction pipe end portion at an inlet of the coagulator to a reaction pipe end portion at an outlet thereof.

9. The method according to claim 1, wherein the latex is one or more selected from styrene polymer latex, butadiene polymer latex, styrene-butadiene copolymer latex, alkyl acrylate polymer latex, alkyl methacrylate polymer latex, alkyl acrylate-acrylonitrile copolymer latex, acrylonitrile-butadiene copolymer latex, acrylonitrile-butadiene-styrene copolymer latex, acrylonitrile-alkyl acrylate-styrene copolymer latex, alkylmethacrylate-butadiene-styrene copolymer latex and alkylacrylate-alkylmethacrylate copolymer latex.

* * * * *